United States Patent
Obermann et al.

(10) Patent No.: US 12,023,748 B2
(45) Date of Patent: Jul. 2, 2024

(54) STATIC DISCHARGE MITIGATION OF POWER TOOLS

(71) Applicant: MILWAUKEE ELECTRIC TOOL CORPORATION, Brookfield, WI (US)

(72) Inventors: Timothy R. Obermann, Waukesha, WI (US); Patrick D. Gallagher, Oak Creek, WI (US); Jessie L Bernitt, Milwaukee, WI (US); Mitchell Carlson, Lisbon, WI (US); Timothy J. Bartlett, Waukesha, WI (US); Alex Huber, Menomonee Falls, WI (US); Travis J. Dubnicka, Pewaukee, WI (US); Daniel R. Ertl, Brookfield, WI (US); Troy C. Thorson, Cedarburg, WI (US); Kevin Staszak, New Berlin, WI (US); Austin Jin, Wauwatosa, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 816 days.

(21) Appl. No.: 17/052,459

(22) PCT Filed: Apr. 28, 2020

(86) PCT No.: PCT/US2020/030185
§ 371 (c)(1),
(2) Date: Nov. 2, 2020

(87) PCT Pub. No.: WO2020/223186
PCT Pub. Date: Nov. 5, 2020

(65) Prior Publication Data
US 2021/0252617 A1    Aug. 19, 2021

Related U.S. Application Data

(60) Provisional application No. 62/841,632, filed on May 1, 2019.

(51) Int. Cl.
*B23D 45/16*    (2006.01)
*B25F 5/02*    (2006.01)
(Continued)

(52) U.S. Cl.
CPC ................ *B23D 45/16* (2013.01); *B25F 5/02* (2013.01); *B23D 59/008* (2013.01); *B24B 27/06* (2013.01); *H05F 3/02* (2013.01)

(58) Field of Classification Search
CPC ......... B23D 45/16; B23D 59/008; B25F 5/02; B25F 3/02; B24B 27/06
(Continued)

(56) References Cited

U.S. PATENT DOCUMENTS

| 1,920,889 A | 8/1933 | Pullen |
| 4,674,146 A | 6/1987 | Tuggle et al. |

(Continued)

FOREIGN PATENT DOCUMENTS

| CN | 101087490 A | 12/2007 |
| CN | 103551605 A | 2/2014 |

(Continued)

OTHER PUBLICATIONS

WO 2017/157292 and Translation (Year: 2023).*
(Continued)

*Primary Examiner* — Nhat Chieu Q Do
(74) *Attorney, Agent, or Firm* — Michael Best & Friedrich LLP (57) ABSTRACT

A cut-off saw configured to remove material from a workpiece, the cut-off saw includes a motor, a blade, a drive assembly, a handle, and a coating. The blade is capable of removing material from the workpiece upon contact between the blade and the workpiece. The drive assembly is coupled to the motor and the blade and is configured to transmit torque from the motor to the blade. The handle is (Continued)

configured to be grasped by a user, and includes a surface and a first material having a first surface resistivity. The coating covers at least a portion of the handle. The coating is configured to distribute static electricity away from the surface. The coating is made of a second material having a second surface resistivity less than the first surface resistivity.

13 Claims, 5 Drawing Sheets

(51) Int. Cl.
    *B23D 59/00* (2006.01)
    *B24B 27/06* (2006.01)
    *H05F 3/02* (2006.01)

(58) Field of Classification Search
    USPC .................................................. 30/392, 388
    See application file for complete search history.

(56) References Cited

U.S. PATENT DOCUMENTS

| | | | |
|---|---|---|---|
| 4,873,608 A | 10/1989 | Yoshimura | |
| 6,552,891 B1 | 4/2003 | Prach | |
| 8,359,704 B2 | 1/2013 | Yamazaki et al. | |
| 9,085,008 B2 | 7/2015 | Kinne et al. | |
| 9,179,811 B2 | 11/2015 | Fukunaga et al. | |
| 2002/0141131 A1* | 10/2002 | Gorczyca | B03C 3/155 361/231 |
| 2004/0117990 A1 | 6/2004 | Bohne et al. | |
| 2007/0234998 A1 | 10/2007 | Kinoshita et al. | |
| 2015/0327352 A1 | 11/2015 | Kikuchi et al. | |
| 2016/0330913 A1* | 11/2016 | Shao | F04D 29/545 |
| 2019/0075639 A1 | 3/2019 | Brueck et al. | |
| 2019/0174910 A1* | 6/2019 | Xu | A46D 1/0223 |
| 2019/0393761 A1* | 12/2019 | Eshleman | H02K 11/26 |

FOREIGN PATENT DOCUMENTS

| | | | | |
|---|---|---|---|---|
| CN | 104475774 A | | 4/2015 | |
| CN | 105921812 A | * | 9/2016 | ............ B23D 45/16 |
| CN | 106284150 B | | 1/2017 | |
| DE | 102004027822 B4 | | 11/2017 | |
| EP | 1245289 A2 | | 10/2002 | |
| EP | 2957207 B1 | | 8/2016 | |
| JP | 3056049 U | | 2/1999 | |
| JP | 2008062332 A | | 3/2008 | |
| JP | 2015191735 A | | 11/2015 | |
| JP | 2018065349 A | | 4/2018 | |
| RU | 112015 U1 | * | 1/2012 | |
| TW | 522045 B | | 3/2003 | |
| WO | 2016138961 A1 | | 9/2016 | |
| WO | WO-2017157292 A1 | * | 9/2017 | ............... A47L 9/28 |

OTHER PUBLICATIONS

RU112015 U1 and Translation (Year: 2023).*
CN-105921812-A and Translation (Year: 2023).*
Translation, WO 2017157292 A1 (Year: 2024).*
International Search Report and Written Opinion for Application No. PCT/US2020/030185 dated Aug. 13, 2020 (10 pages).
Extended European Search Report for Application No. 20798032.7 dated Dec. 14, 2022 (7 pages).
Chinese Patent Office Action for Application No. 202080032912.0 dated Apr. 27, 2023 (19 pages including English translation).

* cited by examiner

STATIC DISCHARGE MITIGATION OF POWER TOOLS

RELATED APPLICATIONS

This application is a national stage filing under 35 U.S.C. § 371 of International Application No. PCT/US2020/030185, filed Apr. 28, 2020, which claims the benefit of prior-filed U.S. Provisional Application No. 62/841,632, filed May 1, 2019, the entire contents of which are hereby incorporated by reference.

FIELD OF THE INVENTION

The present invention relates to a power tools, and more particularly to power tools having static discharge mitigation capabilities.

BACKGROUND OF THE INVENTION

There are various power tools known in the art that accumulate static charge while in use, which can be discharged to an operator via a tool housing, and particularly, a tool handle. Specifically, abrasive saws may accumulate a static electrical charge through repeated contact between a blade and a workpiece. Charged debris from the work piece may accumulate on various components of the saw. Upon reaching a high enough level, static electricity may be discharged either to the user as a shock via a handle of the tool or to the tool electronics.

SUMMARY OF THE INVENTION

The present invention provides, in one aspect, a power tool provided with a coating to distribute static electricity away from the surface of the handle of the tool. The tool includes a handle configured to be grasped by a user. The handle includes a surface and a first material having a first surface resistivity. The tool includes a coating covering at least a portion of the handle. The coating is configured to distribute static electricity away from the surface. The coating is made of a second material having a second surface resistivity less than the first surface resistivity.

The present invention provides, in another aspect, a power tool provided with a handle including a base material and an additive. The handle is configured to be grasped by a user, and includes a base material and. The handle has a first volume resistivity and a first surface resistivity. The base material has a second volume resistivity and a second surface resistivity. The additive causes the first volume resistivity and the first surface resistivity of the handle to be less than the second volume resistivity and the second surface resistivity of the base material, respectively, such that the base material and the additive are configured to distribute static electricity away from the handle.

Independent features and independent advantages of the invention will become apparent to those skilled in the art upon review of the detailed description, drawings and claims.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
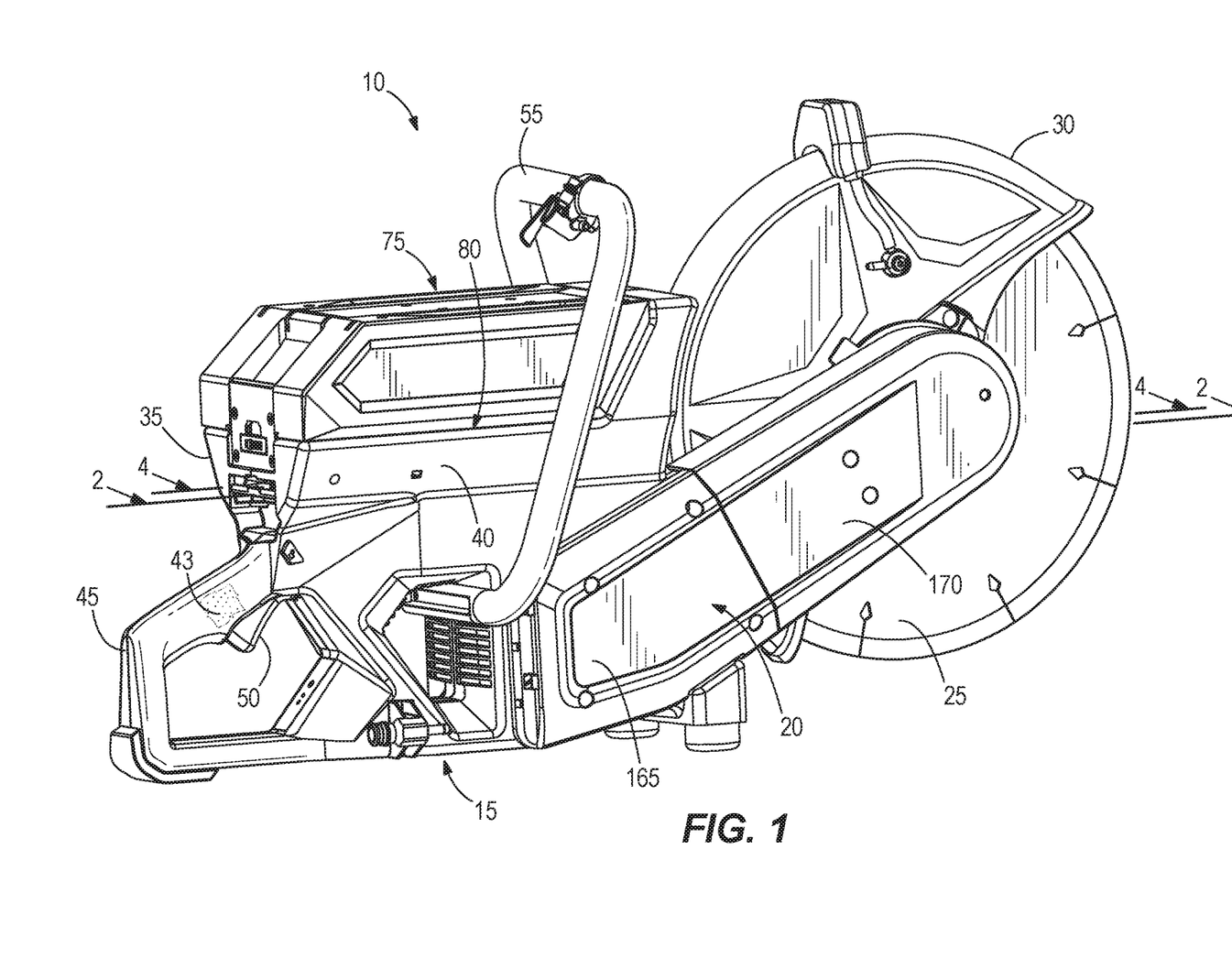
FIG. 1 is a perspective view of a cut-off saw including plastic clamshell housing halves with an additive to reduce the electrical resistivity of the housing.

FIG. 1 illustrates a handheld power tool 10, which is a cut-off saw in the illustrated embodiment. The saw 10 includes a housing 15, a support arm 20 coupled to and extending from the housing 15, a cutting wheel 25 carried by the support arm 20, and a guard 30 covering a portion of the circumference of the cutting wheel 25. The cutting wheel 25 can be a blade, an abrasive disk, or any other rotatable element capable of removing material from a workpiece. In the illustrated embodiment, the cutting wheel 25 has a diameter greater than 9 inches and is preferably 14 inches in diameter. In other embodiments, the cutting wheel 25 can be between about 10 inches and about 16 inches in diameter.

Referring again to FIG. 1, the illustrated housing 15 is a clamshell housing having left and right cooperating halves 35, 40. A first or rear handle 45 extends from a rear portion of the housing 15 in a direction generally opposite the support arm 20. A trigger 50 for operating the saw 10 is located on the rear handle 45. In the illustrated embodiment, the saw 10 also includes a second or forward handle 55 that wraps around an upper portion of the housing 15. The forward handle 55 and the rear handle 45 provide grip areas to facilitate two-handed operation of the saw 10.

Figure 2:
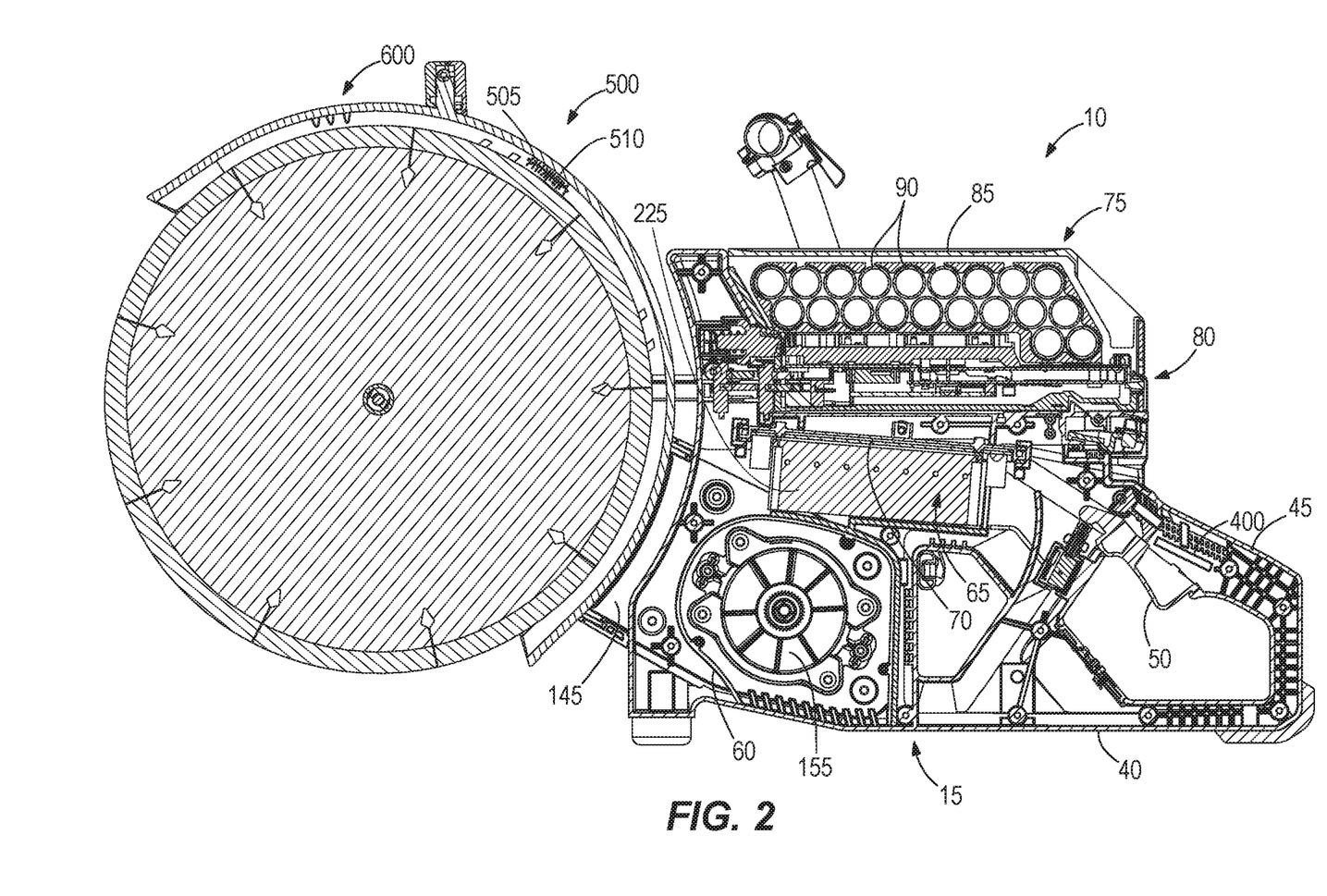
FIG. 2 is a cross-sectional view of the saw of FIG. 1, taken along line 2-2 in FIG. 1.

Referring to FIG. 2, the saw 10 further includes a motor housing 60 formed within the housing 15 at a front, lower portion of the housing 15. An electric motor (not shown) is mounted in the motor housing 60. The motor is preferably a brushless direct-current ("BLDC") motor. Operation of the motor is governed by a motor control system 65 including a printed circuit board ("PCB") 70.

With reference to FIGS. 1 and 2, the illustrated saw 10 includes a battery pack 75 that provides power to the motor. The battery pack 75 is removably coupled to a battery receptacle 80, which is located on the upper portion of the housing 15 in the illustrated embodiment (FIG. 1). As such, the forward handle 55 at least partially surrounds the battery receptacle 80 and the battery pack 75, when the battery pack 75 is coupled to the receptacle 80. The illustrated battery pack 75 is a power tool battery pack and includes a battery housing 85 and a plurality of rechargeable battery cells 90 (FIG. 2) disposed within the housing 85. The battery cells 90 are lithium-based battery cells but can alternatively have any other suitable chemistry. In the illustrated embodiment, the battery pack 75 has a nominal output voltage of about 80V. In other embodiments, the battery pack 75 can have a different nominal voltage, such as, for example, 36V, 40V, 72V, between 36V and about 80V, or greater than 40V.

Figure 3:
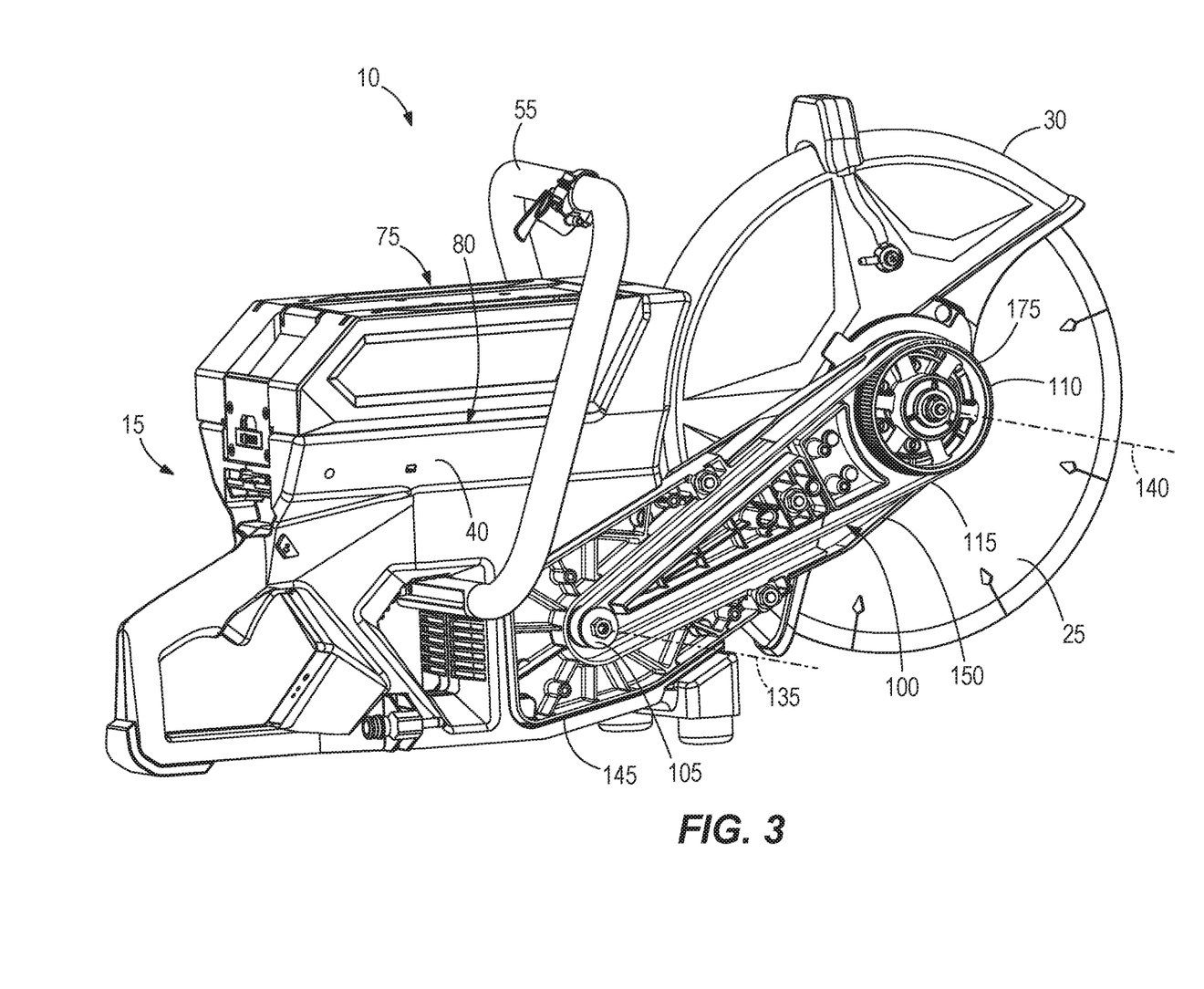
FIG. 3 is a perspective view of the saw of FIG. 1, with a belt cover removed, illustrating a drive assembly of the saw.

The saw 10 includes a drive assembly 100 for transmitting torque from the motor to the cutting wheel 25 (FIG. 3). The drive assembly 100 includes a drive pulley 105 fixed to an output shaft (not shown) of the motor, a driven pulley 110 connected to the drive pulley 105 by a belt 115, a spindle (not shown) fixed to the driven pulley 110, and a clamp assembly (not shown) coupled to the spindle 120. The belt 115 is a synchronous belt having a plurality of teeth (not shown) extending laterally across a width of the belt 115. The teeth (not shown) are engageable with corresponding teeth 175 on the driven pulley 110 and the drive pulley 105. In some embodiments, a clutch mechanism may be provided between the output shaft and the drive pulley 105 to selectively interrupt torque transfer between the output shaft and the drive pulley 105.

With reference to FIGS. 1-3, the drive pulley 105 defines a first rotational axis 135, and the driven pulley 110 defines a second rotational axis 140 spaced from the first rotational axis (FIG. 3). The support arm 20 includes a first arm portion 145 coupled to the housing 15 and a second arm portion 150 coupled to the first arm portion 145. In the illustrated embodiment, the first arm portion 145 includes a mount 155 to which the motor is directly fastened (FIG. 2). The output shaft of the motor extends through the first arm portion 145 to the drive pulley 105 (FIG. 3). The spindle 120 extends through the second arm portion 150 and is supported by two bearings (not shown). In the illustrated embodiment, first and second covers 165, 170 (FIG. 1) are secured to the first and second arm portions 145, 150 to enclose the drive assembly 100 during ordinary operation. The covers 165, 170 are coupled to the respective arm portions 145, 150 by screws, but can be attached via a snap fit or any other suitable manner in other embodiments.

Figure 4:
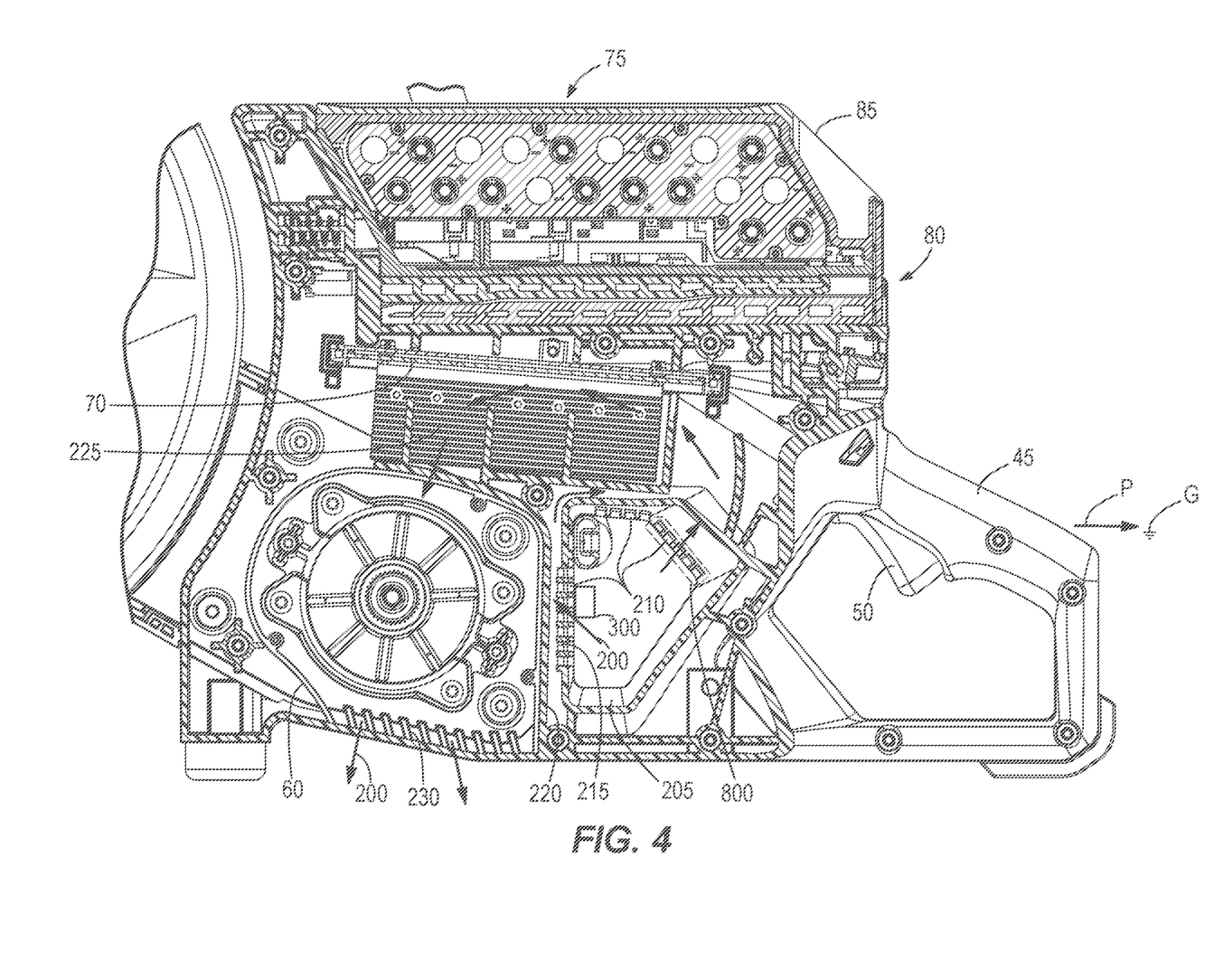
FIG. 4 is an enlarged cross-sectional view of the saw taken along a line 4-4 in FIG. 1.

With reference to FIG. 4, the saw 10 further includes a closed cooling path 200 that extends through the housing 15. The illustrated housing 15 includes an aperture 205 that extends laterally through the housing 15, at a position between the rear handle 45 and the motor housing 60. Slotted air intake openings 210 line the aperture 205 and communicate with the interior of the housing 15. In the illustrated embodiment, the aperture 205 has a generally pentagonal or five-sided cross-section, and the air intake openings 210 are positioned on three of the five sides of the aperture 205. The position of the air intake openings 210 in the aperture 205 helps to shield the openings 210 from fluid, dust, and debris present during operation of the saw 10. In other embodiments, the air intake openings 210 may be arranged and positioned differently. Additionally, the saw 10 may not include the aperture 205, and may draw intake air from other locations, such as from proximate the rear handle 45.

With continued reference to FIG. 4, the air intake openings 210 communicate with an air space 215 that is separated from the interior of the motor housing 60 by a wall 220. Air drawn through the air intake openings 210 is routed along the cooling path 200 by the wall 220 and various other walls and baffles, which direct the air past a finned heat sink 225 to cool the PCB 70. After passing over the heat sink 225, the air can enter the motor housing 60, cooling the motor before being discharged through slotted exhaust openings 230 located on the bottom portion of the housing 15. A fan (not shown) is provided with the motor to induce the airflow along the cooling path 200 during operation of the saw 10.

With each contact between the blade 25 and a work piece, the difference between the charge affinity of the blade 25 and the charge affinity of the work piece induces a static charge within the saw 10. The amount of charge created per unit energy associated with friction between two contacting insulators (such as the workpiece and the blade 25) can be estimated through a difference between the charge affinity of the two contacting insulators. Charge affinity can be experimentally quantified, and is tabulated in a triboelectric table.

A triboelectric table describes the charge affinity of many insulators to predict which material will become positively charged and which material will become negatively charged when the two materials are pressed or rubbed together. A triboelectric table also predicts the strength of the effect of pressing or rubbing two different materials together. Materials that induce charge when rubbed together may include insulators, and may include air. Charge affinity is experimentally measured in nC/J, or nano-Coulombs of charge per Joule of energy associated with the pinching or friction between the two materials.

To obtain the expected amount of charge in each contacting insulator per unit energy of associated friction, a difference is taken between the charge affinity of the first insulator and the second insulator. Additionally, to determine which insulator will become positively charged, and which insulator will become negatively charged, a metal effect column is provided in a typical triboelectric table. A '+' sign or '−' sign indicates the polarity of the resulting charge for each insulator after pinching or frictional contact. The '+' sign corresponds with a positive charge and the '−' sign corresponds with a negative charge.

For example, when a blade 25 having a charge affinity of +7 nC/J and a positive polarity contacts a Polyvinyl Chloride (PVC) pipe (a workpiece) having a charge affinity of −100 nC/J and a negative polarity, the difference between the two charge affinities is 107 nC/J. Thus, for every joule of energy used to cut the PVC pipe with the blade 25, −107 nC of charge is retained in the PVC pipe and associated PVC debris created during the cutting operation. Additionally, +107 nC of charge is retained in the blade 25 of the saw 10. Additionally, PVC debris may impact the guard 30, handle 45, motor housing 60, fan (not shown), and belt 115, as well as other portions of the saw 10. These additional impacts further induce a static charge within the saw 10. Thus, in a cutting operation of PVC pipe, a significant amount of static charge can be generated on the saw 10.

Table 1 below lists the charge affinities of some of the components of the cut-off saw 10 and corresponding charge affinities between contacting insulators. Table 1 also lists an induced charge between the two insulators per joule of contact force between the two insulators. The material properties of the cut-off saw 10 correspond with the charge affinities shown in Table 1. It is possible that another material be substituted for PVC as a workpiece. Accordingly, PVC and PVC debris, and the charge affinities corresponding to PVC and PVC debris, must be updated in Table 1 to perform a similar analysis with a work piece of a different material.

TABLE 1

Charge Affinity Differences between Insulators

| First Insulator | | Second Insulator | | Difference Induced |
|---|---|---|---|---|
| Component | Charge Affinity [nC/J] | Component | Charge Affinity [nC/J] | Static Charge [nC/J] |
| Blade (25) | +7 | PVC Pipe (example work piece) | −100 | 107 |

TABLE 1-continued

Charge Affinity Differences between Insulators

| First Insulator | | Second Insulator | | Difference Induced |
| --- | --- | --- | --- | --- |
| Component | Charge Affinity [nC/J] | Component | Charge Affinity [nC/J] | Static Charge [nC/J] |
| Guard (30) | +38 | PVC Debris | −100 | 62 |
| Handle (45) | −5 | PVC Debris | −100 | 95 |
| Motor housing (60) | +30 | PVC Debris | −100 | 130 |
| Fan (not shown) | +30 | PVC Debris | −100 | 130 |
| Belt (115) | −98 | PVC Debris | −100 | 2 |
| Pulley (110 or 105) | +10 | Belt (115) | −98 | 108 |

As evident from the data in Table 1, the cut-off saw 10 provides many possible locations for static charge to be induced between the saw 10, a work piece and the workpiece debris. Additionally, components of the cut-off saw 10 rub or otherwise contact each other, and thus can induce a static charge on the contacting components of the saw 10.

One consideration of the current invention is to reduce the static charge generated by a large difference in charge affinity between the components of the tool 10 and workpieces that frequently contact each other at a high amount of pinching or frictional energy. Thus, the amount of induced static charge within the saw 10 can be decreased and the intensity and frequency of static discharge to the user or the electronics of the saw 10 can be mitigated.

Further, the clamshell halves 35, 40 defining the handle 45 may include a coating or additive 43 to disperse static charge accumulated in the handle 45 into the environment. Purposefully, the coating or additive 43 allows the induced static charge within the saw 10 a less resistive path to discharge so that it does not accumulate in any one location on or within the saw 10. With reference to FIG. 1, the clamshell halves 35, 40 include an additive 43 that, compared to the base material of the clamshell halves 35, 40, changes the electrical conductivity properties of the clamshell halves 35, 40 to provide a lower surface resistivity or volume resistivity to the housing 15. Thus, a less resistive path is formed to discharge any static electric charge accumulated on the housing 15 or any of the internal components of the saw 10 (e.g., the motor or printed circuit board 70). The static charge may be conducted away from the internal components of the saw 10 through the clamshell halves 35, 40, provided that the halves 35, 40 allow for a less resistive path P to ground G than a ground path conducted through the saw components. Although the additive 43 is only shown in FIG. 1 being associated with the handle 45, in some embodiments of the saw 10, the additive 43 is spread throughout the entirety of the clamshell halves 35, 40. However, in other embodiments, the additive 43 may be confined to the handle 45 to provide a ground path through the handle 45 and the user of the saw 10.

The clamshell halves 35, 40 forming the handle 45 may be formed in a plastic injection molding process, which may include the additive 43. Alternatively, the clamshell halves 35, 40 may be formed in any one of a variety of different manufacturing process. The additive 43 may change the electrical resistivity properties of the handle 45. Specifically, the additive 43 may have a surface resistance and volume resistivity that are different from the surface resistance and volume resistivity of the base material used in forming the clamshell halves 35, 40. In one embodiment of the saw 10, the additive 43 is dispersed throughout the clamshell halves 35, 40 such that the injection molded handle 45 has a relatively constant surface resistance and volume resistivity throughout the handle 45. It is envisioned that additive 43 may be dispersed only within certain regions of the handle 45 such that certain regions of the handle 45 have different electrical resistivity properties than other regions of the handle 45.

Surface resistance is a measurement of current resistance of a material in a direction along a plane forming a sheet of the material. Surface conductivity is a measurement of current flow of a material in a direction along a plane forming a sheet of the material. Volume resistivity is a measurement of current resistance of a material in a direction perpendicular to a plane formed by a sheet of material. Volume conductivity is a measurement of current flow of a material in a direction perpendicular to a plane formed by a sheet of material.

In the embodiment of the saw 10 illustrated in FIG. 1, the surface resistance and volume resistivity of the additive 43 used to form the clamshell halves 35, 40 are lower than the surface resistance and volume resistivity of commonly used base injection molded plastics. As the surface resistance and volume resistivity of the handle 45 (with the additive 43) are lower than the base material of the handle 45 without the additive 43, static charge more freely flows through the handle 45. In absence of the additive 43, static charge is likely to accumulate on the handle 45. In contrast, the handle 45 with the dispersed additive 43 allows charge to more freely flow through the handle 45 and, typically, through the user and to the ground. Thus, by dispersing the additive 43 at least throughout the handle 45, during a cutting operation with the saw 10, it is less likely that static charge will accumulate on the saw 10 and discharge through the user as an electrical shock or through the electronic components of the saw 10.

Figure 5:
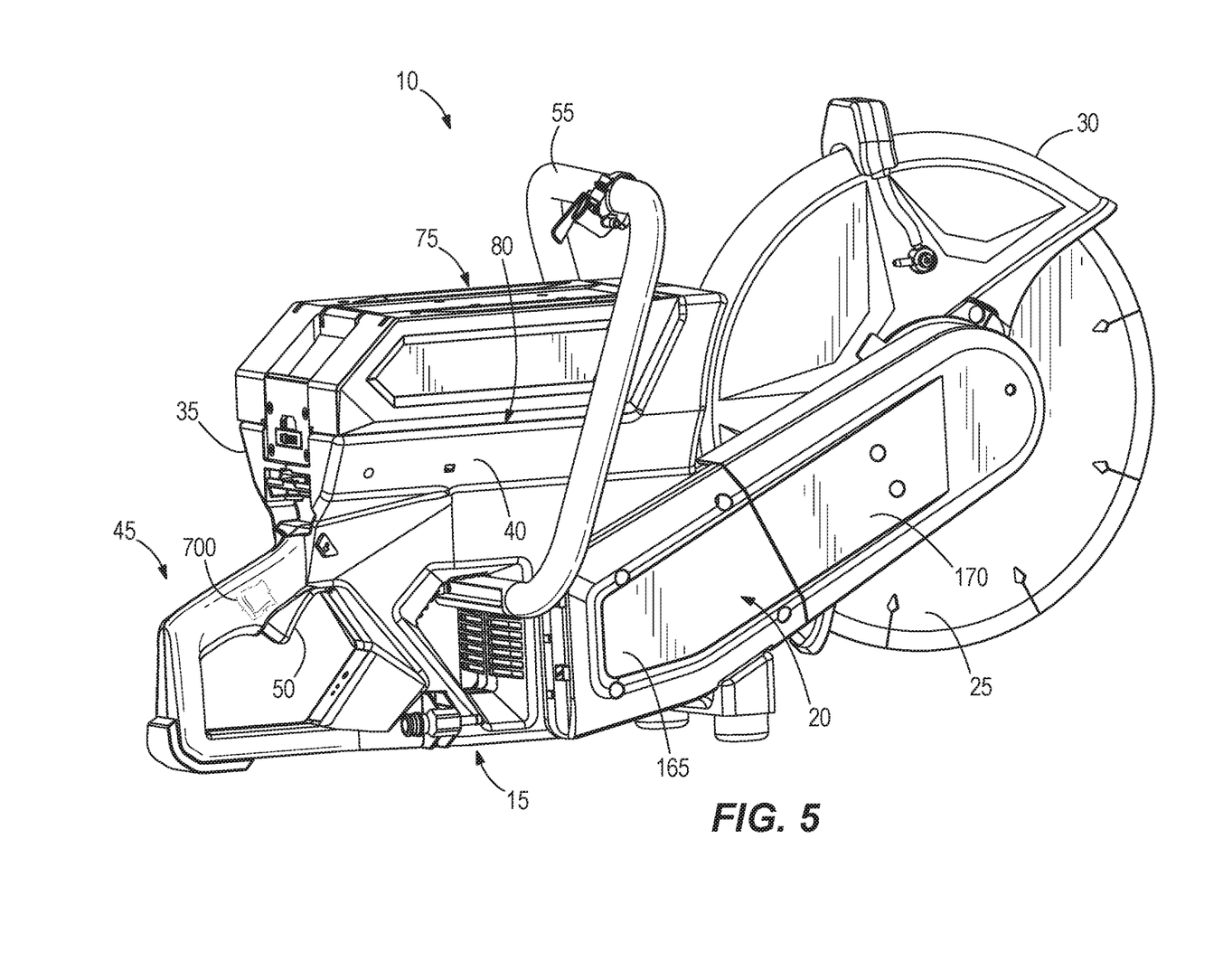
FIG. 5 is a perspective view of a cut-off saw having a handle coated to reduce the electrical resistivity of the handle.

In the embodiment illustrated in FIG. 5, the cut-off saw 10 includes a coating 700 substantially enclosing the handle 45. The coating 700 may cover or enclose a portion of the handle 45, or the entire handle 45. Alternatively or additionally, the coating 700 may cover or enclose a portion of the interior surface of the clamshell halves 35, 40. The coating 700 is made of a material different than the remainder of the handle 45. The material of the coating 700 may have a surface resistance and volume resistivity that are different from the surface resistance and volume resistivity of the handle 45. Specifically, the coating 700 may have a surface resistance or volume resistivity that is less than the surface resistance or volume resistivity than the base material of the handle 45. The coating 700 distributes static charge away from the surface of the cut-off saw 10. In some embodiments of the saw 10, the coating 700 may be less than 0.1 mm thick. And, in some embodiments, the coating 700 may comprise a conductive paint or the like having a surface resistance of $10^8$ ohms (a).

As described above and illustrated in FIG. 1, the volume resistance and surface resistance of the handle 45 may be influenced by the addition of one or more additives 43 to commonly used injection molding plastics. Additionally, as described above and illustrated in FIG. 5, surface resistance of the handle 45 may be influenced by a coating 700 on the handle 45. Any number of additives 43 with any number of volume and surface resistances may be added to the handle plastic or provided in a handle coating. However, Table 2 provides a list of materials that may be relevant and useful in the design of tools, and specifically power tools, for the mitigation of static discharge. The columns of the table below provide the trade name of the additive 43, surface resistance, volume resistivity, and manufacturer of each relevant material.

TABLE 2

List of Relevant Materials

| Additive/Trade Name | Manufacturer | Surface Resistance [Ω] | Volume Resistivity [Ω · cm] |
|---|---|---|---|
| MAC-601 ASBKG002 | Kingfa | 1E6–1E9 | Unknown |
| HP-126 | Kingfa | Unknown | 1E16 |
| MAC-851 | Kingfa | 1E16 | 1E16 |
| PERMASTAT PLUS 2500 A | RTP Co. | 1E7–9.9E8 | 1E7–9.9E8 |
| PERMASTAT 2500 | RTP Co. | 1E9–9.9E10 | 1E9–9.9E10 |
| ESD C 2500 | RTP Co. | <1E5 | <1E3 |

For reference, the surface resistance of the base material of the handle 45 (i.e., without the additive 43 or coating 700) is greater than $10^{16}\Omega$. The surface resistance of the base material of the handle 45 with at least one additive 43 is less than $10^{15}\Omega$. Preferably, the surface resistance of the base material of the handle 45 with at least one additive 43 is between $10^{10}$ and $10^{14}\Omega$.

In operation of the saw 10, a user depresses the trigger 50 to activate the motor, which rotates the drive pulley 105, belt 115, and driven pulley 110 to rotate the blade 25. The blade 25 repeatedly contacts a work piece, creating debris that contacts the saw 10 and the air surrounding the saw 10. Thus, a static charge is generated in the saw 10 as a result of the repeated contact between the blade 25 and the workpiece, and the contact between the workpiece debris with the saw 10. In some embodiments of the saw 10, a low surface resistance coating 700 on the handle 45 prevents accumulation of static charge on the handle 45 and other portions of the tool 10 by creating a low-resistance path P to ground G through the handle 45 and the user holding the saw 10. In other embodiments of the saw 10, a low surface resistivity and volume resistivity handle 45 with a dispersed additive 43 prevents accumulation of static charge on the handle 45 and other portions of the tool 10 by creating a low-resistance path P to ground G through the handle 45 and the user holding the saw 10. The additive 43 gives the handle 45 a surface resistivity and a volume resistivity that is less than the surface resistivity and volume resistivity of the base material from which the handle 45 is made. Gradually, static charge created during a cutting operation is directed away from the saw 10, through the handle 45 and user to the surroundings, rather than accumulating over a period of time until the static charge is high enough to potentially shock the user or the electronics of the saw 10.

Additionally or alternatively, the saw 10 may an air ionizer 300 (FIG. 4) to ionize air particles entering the housing 15 via the air intake openings 210. The air ionizer 300 may be located adjacent the air intake openings 210 or the exhaust openings 230. The air ionizer 300 prevents particles from transferring charge to the saw 10 by introducing positively charged particles into the airflow path 200 between the openings 210, 230. Thus, the air ionizer 300 prevents additional charge from building up on the components of the saw 10. Thus, the positively charged particles and negatively charged particles may collide and exchange charge to result in two neutrally charged particles.

Additionally or alternatively, the saw 10 may include a conductive grate or screen 800 covering at least a portion of at least one of the intake openings 210. In some embodiments, the conductive grate 800 may be metal. The grate or screen 800 may be negatively charged and permeable to allow airflow to pass through the air intake openings 210 while also repelling negatively charged particles in the air to restrict access of negatively charged particles to the openings 210. The grate or screen 800 may be fastened to the aperture 205 or another portion of the saw 10 to adequately secure the grate or screen 800 to cover at least one of the intake openings 210.

Additionally or alternatively, the saw 10 may include a static rope 400 configured to conduct induced static electricity away from the saw 10. The static rope 400 may be disposed within the handle 45 (FIG. 2). Alternatively, the static rope 400 may be positioned elsewhere, such as a position external to the saw 10. The static rope 400 may remove static charge from the handle 45, and store this charge in the rope 400 for controlled discharge at a desired time. The static rope 400 may be fastened to the handle 45 or to another portion of the saw 10 in such a way that the static charge accumulated in the static rope 400 can be discharged to ground without a user touching the charged rope 400.

Additionally or alternatively, the saw 10 may include tinsel 500 (FIG. 2) to disperse static charge from the cut-off saw 10. The tinsel 500 may include a solid wire center 505 with fine strands 510 extending from the wire center 505. The tinsel 500 may be made of a relatively conductive material such as copper. The tinsel 500 may be positioned within the handle 45, or within the guard 30 as shown in FIG. 2, to conduct induced static electricity generally away from the saw 10.

Additionally or alternatively, the saw 10 may include spiked features 600 fastened to the guard 30 (FIG. 2). Workpiece debris may frequently contact the guard 30 at a high amount of contact (e.g. friction) energy. The spiked features 600 may contact the workpiece debris within the guard 30 and generate a static charge in the features 600. Thus, static charge can be removed from the debris, and applied to the features 600. The features 600 may be formed from metal, and thus, may be relatively conductive to charge. The features 600 may project from the guard 30 towards the blade 25, and may be fastened to or integrally formed with the guard 30. The features 600 may project from the guard 30 towards the blade 25 from the interior of the guard 30, or through a portion of the guard 30. The accumulated static charge in the features 600 may be dissipated to the environment through ambient air that surrounds the cut-off saw 10.

Various features of the invention are set forth in the following claims.

What is claimed is:

1. A cut-off saw configured to remove material from a workpiece, the cut-off saw comprising:
 a motor;
 a blade capable of removing material from the workpiece upon contact between the blade and the workpiece;
 a drive assembly coupled to the motor and the blade, the drive assembly being configured to transmit torque from the motor to the blade;
 a handle configured to be grasped by a user, the handle including a surface and a first material having a first surface resistivity; and
 a coating covering at least a portion of the handle configured to distribute static electricity away from the surface, wherein the coating is made of a second material having a second surface resistivity less than the first surface resistivity, wherein static charge induced by the cut-off saw follows a path from the cut-off saw to ground, and wherein the path passes through the handle.

2. The cut-off saw of claim 1, further comprising a printed circuit board, wherein the path of static charge from the cut-off saw to ground is conducted away from the printed circuit board.

3. The cut-off saw of claim 1, wherein the coating is less than 0.1 mm thick.

4. The cut-off saw of claim 1, wherein the coating has a surface resistance of less than $10^8$ ohms.

5. The cut-off saw of claim 1, wherein the coating is a conductive paint.

6. The cut-off saw of claim 1, further comprising an air ionizer positioned adjacent an inlet of an airflow path within the cut-off saw, wherein the air ionizer is configured to introduce positively charged particles into the airflow path through the inlet.

7. The cut-off saw of claim 1, further comprising a conductive grate positioned adjacent an inlet of an airflow path within the cut-off saw, wherein the metal grate is configured to repel charged particles from entrance to the airflow path through the inlet.

8. The cut-off saw of claim 1, further comprising a static rope configured to conduct induced static electricity away from the handle.

9. The cut-off saw of claim 8, wherein the static rope is fastened to the handle to allow discharge of the accumulated static charge without the static rope contacting a user.

10. The cut-off saw of claim 1, further comprising conductive tinsel configured to conduct induced static electricity away from the blade.

11. The cut-off saw of claim 1, further comprising conductive spiked features, wherein the conductive spiked features are configured to conduct induced static electricity away from the blade.

12. The cut-off saw of claim 11, further comprising a blade guard, wherein the conductive spiked features are fastened or integrally formed with the blade guard adjacent the blade.

13. The cut-off saw of claim 1, wherein the surface is an exterior surface of the handle, and wherein the coating is applied to an interior surface of the handle.

* * * * *